United States Patent [19]

Amemiya et al.

[11] Patent Number: 5,224,573
[45] Date of Patent: Jul. 6, 1993

[54] HYDRAULIC DAMPER

[75] Inventors: Akihito Amemiya; Munehiro Awataguchi; Issei Kanari; Masashiro Kushida, all of Atsugi, Japan

[73] Assignee: Atsugi Unisia Corporatino, Atsugi, Japan

[21] Appl. No.: 721,178

[22] Filed: Jun. 26, 1991

[30] Foreign Application Priority Data

Jun. 27, 1990 [JP] Japan .................................. 2-68621

[51] Int. Cl.⁵ ............................................. F16F 9/36
[52] U.S. Cl. .............................. 188/322.17; 188/315; 188/322.16; 92/165 R
[58] Field of Search ............. 188/322.17, 315, 322.19, 188/322.16, 318; 92/165 R, 168 R; 277/33, 35, 152, 153; 267/129, 64.15

[56] References Cited

U.S. PATENT DOCUMENTS 4,364,457 12/1982 Wössner et al. .............. 188/322.17

FOREIGN PATENT DOCUMENTS 2092262 8/1982 United Kingdom ........... 188/322.17
2237356 5/1991 United Kingdom ........... 188/322.17

Primary Examiner—Douglas C. Butler
Attorney, Agent, or Firm—Bachman & LaPointe

[57] ABSTRACT

A hydraulic damper with a rod guide made by pressing a circular plate is disclosed. This rod guide includes an inner tubular portion defining a bore supporting a piston rod, an outer tubular portion extending in the same direction as the inner tubular portion does, and a flange portion extending radially outwardly from the outer tubular portion. A ring is connected between an inwardly turned axial end portion of an outer tube and the flange portion. An annular sealing element retainer is disposed in the ring. The ring provides a transmission path of a force, thus preventing the sealing element retainer from being subject to the force.

14 Claims, 3 Drawing Sheets

HYDRAULIC DAMPER

RELATED COPENDING APPLICATION

U.S. patent application Ser. No. 07/697,872 filed on May 9, 1991 by Masahiko HAMADA et al., now U.S. Pat. No. 5,178,243.

BACKGROUND OF THE INVENTION

The present invention relates to a hydraulic damper.

Japanese Utility Model Application First (unexamined) Publication No. 61-148933 discloses a hydraulic damper. This known hydraulic damper comprises an outer tube having an inwardly turned end portion, a cylinder tube disposed in the outer tube and having an axial end, a piston rod disposed in the cylinder tube, a rod guide, and a sealing assembly including a sealing element retainer. Defined between the outer tube and the cylinder tube is a reservoir. The rod guide includes an annular protrusion. The sealing element retainer is interposed between the inwardly turned end portion of the outer tube and the annular protrusion. According to this arrangement, upon application of axial load on the inwardly turned end portion of the outer tube, the sealing element retainer provides a transmission path of force. Specifically, the force is transmitted to the rod guide and then to the cylinder tube. The sealing element has a one-way check sealing lip carried by the sealing element retainer and in sealing contact with a radially extending section of the rod guide disposed inward of the annular protrusion. The rod guide is formed with a passage having one end opening to the reservoir and an opposite end opening at a portion between the annular protrusion and the one-way check sealing lip. In order to increase effectiveness of the seal by the one-way check sealing lip, the sealing element retainer includes a cylindrical axially extending section at which the body of the one-way check sealing lip is securely attached.

An object of the present invention is to improve a hydraulic damper such that a sealing element retainer is not subject to a force upon application of axial load and thus easy to form and manufacture at reduced cost.

SUMMARY OF THE INVENTION

According to one aspect of the present invention, a hydraulic damper is provided with:

an outer tube having an inwardly turned axial end portion;

a cylinder tube disposed in said outer tube and having an axial end;

a piston rod disposed in said cylinder tube;

a rod guide having an inner tubular portion defining a bore supporting said piston rod, an outer tubular portion extending in the same direction as said inner tubular portion does, and a flange portion extending radially outwardly from said outer tubular portion;

said outer tubular portion being in engagement with said cylinder tube;

said flange portion extending radially between said axial end and said outer tube;

a ring connected between said inwardly turned axial end portion and said flange portion of said rod guide;

a sealing assembly including a sealing element retainer supported by said flange portion and disposed in said ring;

whereby said ring provides a transmission path of a force, thus preventing said sealing element retainer from being subject to the force.

According to another aspect of the present invention, a hydraulic damper is provided with:

an outer tube having an inwardly turned axial end portion;

a cylinder tube disposed in said outer tube and having an axial end;

a piston rod disposed in said cylinder tube;

a rod guide made by pressing of a circular plate to have an inner tubular portion defining a bore supporting said piston rod, an outer tubular portion extending in the same direction as said inner tubular portion does, and a flange portion extending radially outwardly from said outer tubular portion;

said outer tubular portion being in engagement with said cylinder tube;

said flange portion extending radially between said axial end and said outer tube;

a ring connected between said inwardly turned axial end portion and said flange portion of said rod guide;

a sealing assembly including a sealing element retainer supported by said flange portion and disposed in said ring;

whereby said ring provides a transmission path of a force, thus preventing said sealing element retainer from being subject to the force.

According to still another aspect of the present invention, a hydraulic damper is provided with:

an outer tube having an inwardly turned axial end portion;

a cylinder tube disposed in said outer tube and having an axial end;

a piston rod disposed in said cylinder tube;

a rod guide made by pressing of a circular plate to have an inner tubular portion defining a bore supporting said piston rod, an outer tubular portion extending in the same direction as said inner tubular portion does, and a flange portion extending radially outwardly from said outer tubular portion;

said outer tubular portion being in engagement with said cylinder tube;

said flange portion extending radially between said axial end and said outer tube;

a ring connected between said inwardly turned axial end portion and said flange portion of said rod guide;

a sealing assembly including a sealing element retainer supported by said flange portion and disposed in said ring;

said outer tubular portion having a coupling section engaged with said cylinder tube and a reduced diameter section which is connected to said inner tubular portion, said reduced diameter section being spaced from said cylinder tube to define an annular clearance between said reduced diameter section and said cylinder tube.

DETAILED DESCRIPTION OF THE INVENTION

Figure 1:
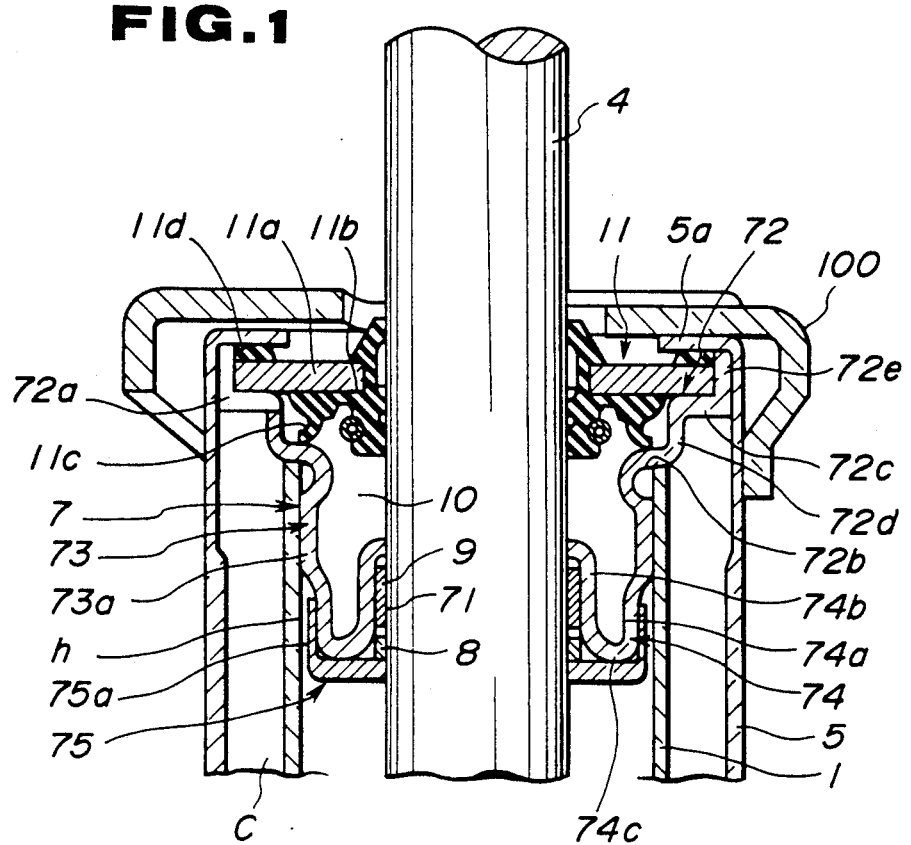
FIG. 1 is a fragmentary enlarged view of FIG. 4, illustrating a first embodiment of a rod guiding structure.
Figure 4:
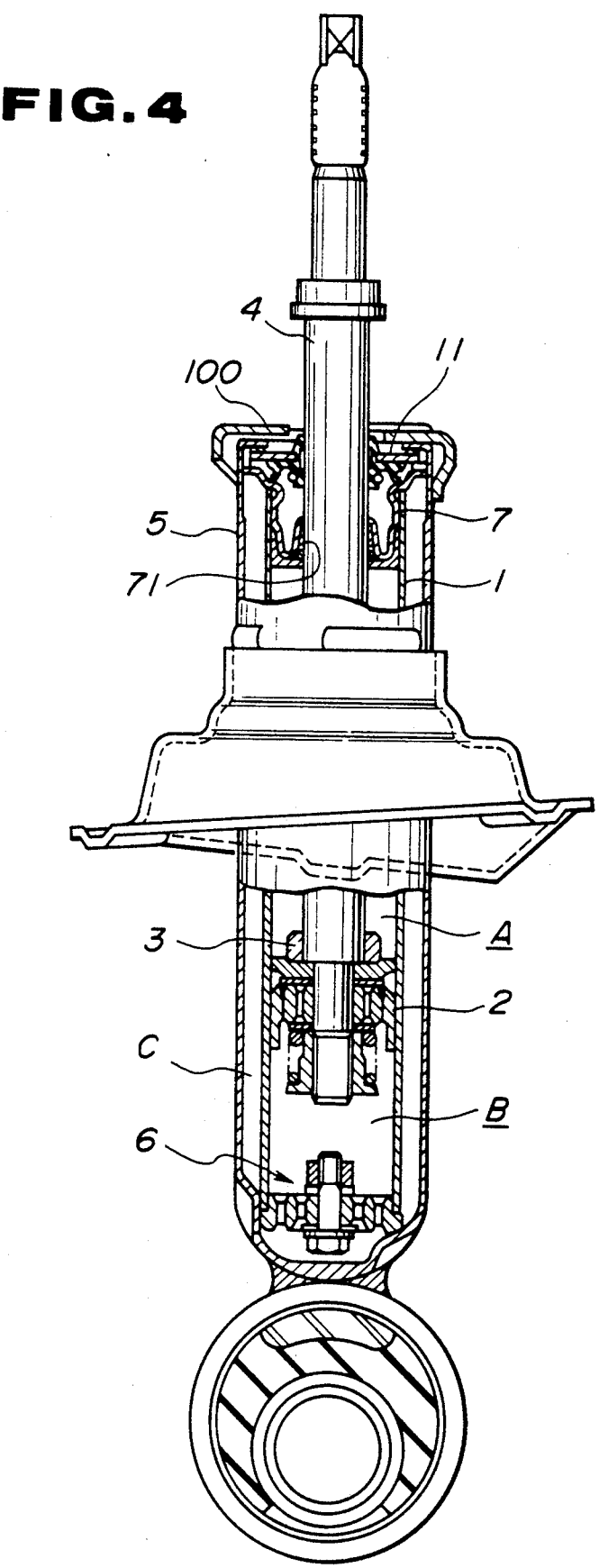
FIG. 4 is a side elevation, partly sectioned through differential radial planes, of a hydraulic damper.
Figure 5:
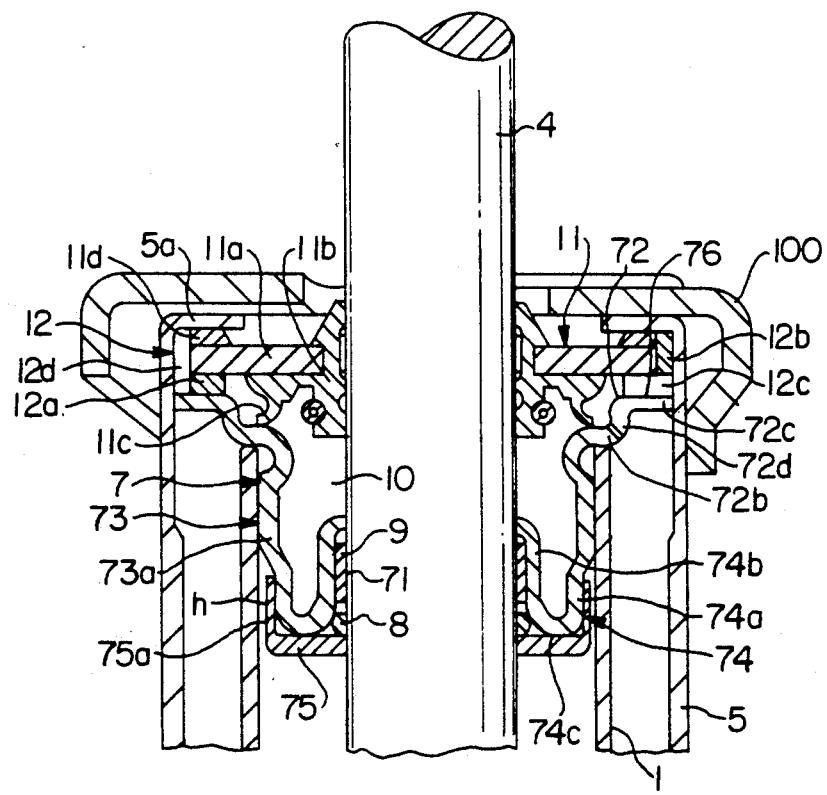
FIG. 5 is a similar view to FIG. 1, illustrating a second embodiment.

Referring to the accompanying drawings, FIG. 4 shows a hydraulic damper which comprises in the usual manner a cylinder tube 1, a piston 2, a rebound rubber 3, a piston rod 4, an outer tube 5, a base 6, a rod guide 7, an upper chamber A, a lower chamber B, and a reservoir C. As best seen in FIG. 1, the cylinder tube 1 is disposed in the outer tube 5, and the piston rod 4 is disposed in the cylinder tube 1. The detailed description of the hydraulic damper is hereby omitted since it is well known in the art.

Referring to FIG. 1, the rod guide 7 is made by pressing of a circular plate. In the press forming process, the circular plate is shaped into a body which has an inner tubular portion, an outer tubular portion extending in the same direction as the inner tubular portion does, and a flange portion extending radially outwardly from the outer tubular portion.

Specifically explaining the rod guide 7, the outer tubular portion has a coupling section, generally denoted by the reference numeral 73, in the form of an axially extending wall 73a engaged with the adjacent inner wall of the cylinder tube 1, and a reduced diameter section 74a in the form of an axially extending wall which is connected via a radially extending section 74c to the inner tubular portion 74b, in the form of an axially extending wall defining a bore 71 for supporting the piston rod 4. Disposed between the inner tubular portion 74b and the piston rod 4 is a bushing 9. A stop cap 75 is coupled with the reduced diameter section 74a with its axially extending wall 75a engaged with the axially extending wall of the reduced diameter section 74b. The relationship between the reduced diameter section 74a, the cylinder tube 1 and the stop cap 75 is such that there is provided an annular clearance defined between the axially extending wall 75a of the stop cap 75 and the adjacent cylindrical inner wall of the cylinder tube 1. This clearance is indicated by the reference character h. Disposed between the inner tubular portion 74b, the bushing 9, the piston rod 4 and the stop cap 72 is a sealing ring 8. The stop cap 75 functions to hold the sealing ring 8 is its proper operative position. From the preceding description, it will be understood that the reduced diameter section 74a, the radially extending section 74c, and the inner tubular portion 74b cooperate with each other to function as a rod support generally denoted by the reference numeral 74.

The flange portion is generally denoted by the reference numeral 72 and includes an inner radially extending annular section 72b in abutting engagement with an axial end of the cylinder tube 1, an outer radially extending annular section 72c, and a cylindrical axially extending section 72d interconnecting the inner and outer radially extending annular sections 72b and 72c. In this embodiment, the flange portion 72 also includes an integral ring 72e engaged with the adjacent inner wall of the outer tube 5.

Figure 2:
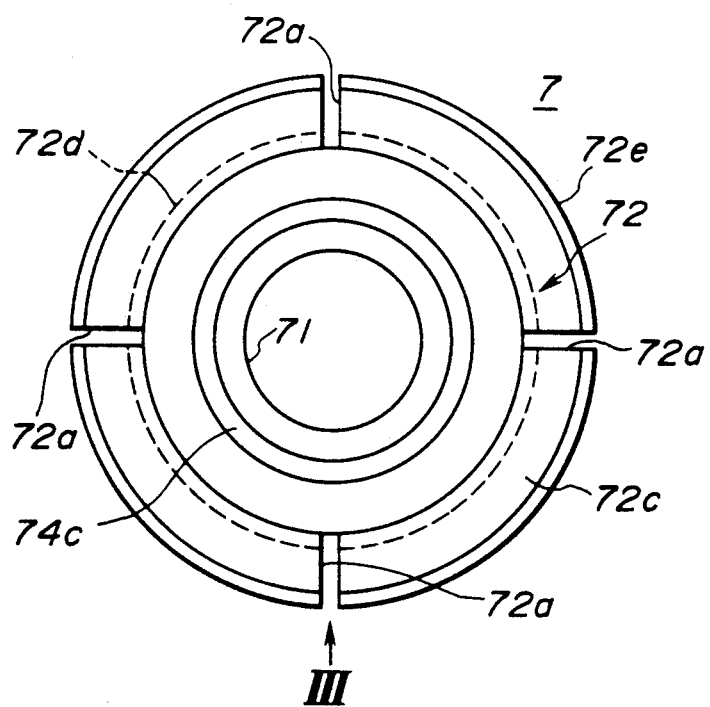
FIG. 2 is a plan view of a rod guide used in the structure shown in FIG. 1.
Figure 3:
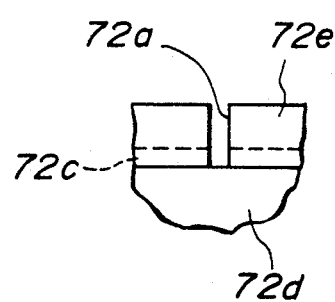
FIG. 3 is a fragmentary elevation of FIG. 2 as viewed in a direction of an arrow III.

Generally denoted by the reference numeral 11 is a sealing assembly which includes an annular plate 11a serving as a sealing element retainer. The retainer 11a is disposed on the outer radially extending section 72c and within the ring 72e. In order to seal a space between the piston rod 4 and the inner periphery of the retainer 11a, a lip seal 11b is carried by the retainer 11a in sealing contact with the piston rod 4. In order to prevent reverse flow of hydraulic fluid from the reservoir C inwardly into a space 10, a one-way check sealing lip 11c is carried by the retainer 11a in contact with the inner radially extending section 72b. As best seen in FIGS. 2 and 3, the outer radially extending section 72c and the ring 72e is formed with two pairs of diametrically opposed cutouts 72a. Hydraulic fluid having passed radially outwardly through the one-way check sealing lip 11c flows through these cutouts 72a into the reservoir C.

The height of the ring 72e is greater than the thickness of the retainer 11a so that the ring 72e is in abutting engagement with an inwardly curled or turned axial end portion 5a of the outer tube 5. Disposed between the inwardly turned end portion 5a of the outer tube 5 and the retainer 11a is a seal 11d. In FIG. 2 as well as in FIG. 1, the reference numeral 100 designates a cap coupled with the outer tube 5.

As described before, the rod guide 7 results from pressing a circular plate to form the body as shown in FIGS. 1 and 2 and cutting the cutouts 72a. Thus, the rod guide 7 is very light since it is made from a circular plate. Besides, it is easy to form and manufacture at reduced cost.

In assembly, the guide rod 7, stop cap 75, bushing 9, sealing ring 8, and piston rod 4 are assembled. This assembly is inserted into the cylinder tube 1 until the inner radially extending section 72b is engaged by the axial end of the cylinder tube 1. In this position, the rod guide 7 has the coupling section 73 thereof in firm engagement with the cylinder tube 1 and the ring 72e thereof in firm engagement with the outer tube 5.

Then, the sealing assembly 11 is inserted into the ring 72c by placing the retainer 11a on the outer radially extending section 72c. Finally, the axial end portion of the outer tube 5 is turned inwardly at 5a until it exerts an axial preload on the ring 72e of the rod guide 7.

From the preceding description, it will be understood that the rod guide 7 is held in appropriate position owing to engagement of the ring 72e with the outer tube 5, engagement of the coupling section 73 with the cylinder tube 1, and engagement of the rod support 74 with the piston rod 4. Thus, radial relationship between the piston rod 4, cylinder tube 1 and outer tube 5 is maintained in an appropriate manner.

Since the flange portion 72 of the rod guide 7 is subject to axial load transmitted thereto through the inwardly turned axial end portion 5a of the outer tube 5, such load is transmitted to the cylinder tube 1 through the guide rod 7. Thus, the sealing element retainer 11a is not subject to any load.

Upon application of a radial or lateral load on the piston rod 4 during its reciprocal stroke, the piston rod 4 tilts. This tilting movement of the piston rod 4 is followed by the rod support 74 owing to the provision of the clearance h and its resiliency. Thus, increase in friction between the piston rod 4 and the rod support 74 resulting from the tilting motion is suppressed.

As a result, a smooth reciprocal motion of a piston rod of a hydraulic damper is always assured and thus an operating life of the damper is improved owing to the use of a rod guiding structure according to the present invention.

During rebounding stroke, the stop cap 75 abuts the rebound rubber 3. Axial load to the stop cap 75 is transmitted by the rod guide 7 to the outer tube 5.

Hydraulic fluid leaks into the space 10 during reciprocal motion of the piston rod 4. This hydraulic fluid returns to the reservoir C via the one-way check sealing lip 11c and cutouts 72a when pressure within the space 10 increases.

From the preceding description, it will now be appreciated that the sealing element retainer 11a is not subject to any force upon application of axial load and formed with any cutouts nor passages for hydraulic fluid returning to the reservoir C. Thus, the retainer 11a may take any simple configuration which is easy to form and manufacture at reduced cost.

Figure 6:
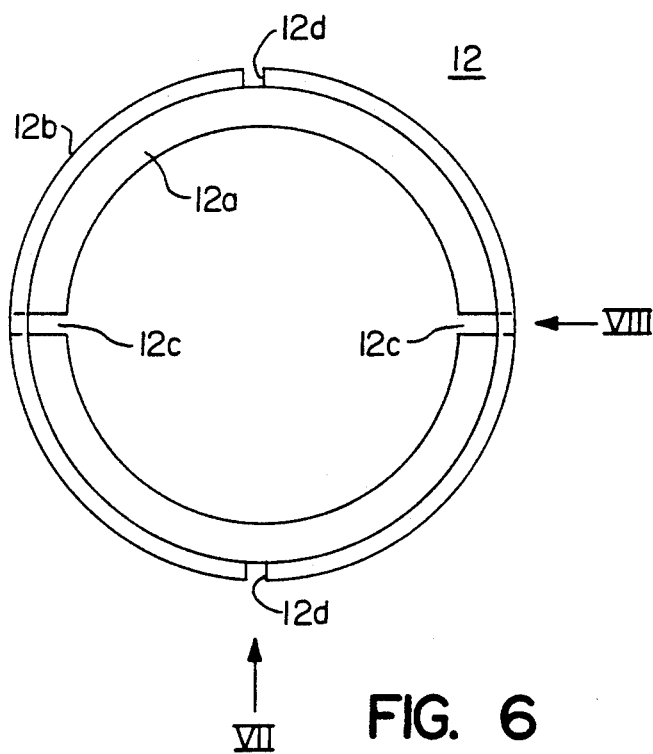
FIG. 6 is a plan view of a rod guide used in the structure shown in FIG. 5.
Figure 7:
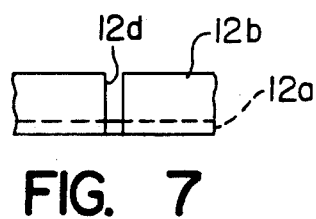
FIG. 7 is a fragmentary view of FIG. 6 as viewed in a direction of an arrow VII.
Figure 8:
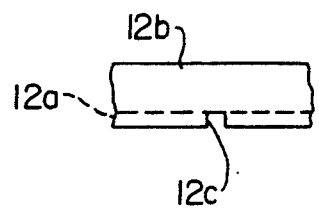
FIG. 8 is a fragmentary view of FIG. 6 as viewed in a direction of an arrow VIII.

A second embodiment is explained in connection with FIGS. 5 to 8. This second embodiment is substantially the same as the first embodiment except that instead of the integral ring 72e, a separate ring 12 is used. As best seen in FIG. 6, the ring 12 includes an axially extending wall 12b and an annular radially inwardly extending wall 12a disposed on an outer radially extending wall 72c of a rod guide 74. The radially inwardly extending wall 12a of the ring 12 is formed with a pair of diametrically opposed cutouts 12c which mate with two diameterically opposed cutouts, only one being shown at 76 in FIG. 5, of the outer radially extending wall 72c, respectively. Hydraulic fluid forced out of a space 10 during stroke of a piston rod 4 passes through the cutouts 12c and 76. The axially extending wall 12a of the ring 12 is formed with a pair of diameterically opposed cutouts 12d which are used when gas is supplied under pressure to a reservoir C.

What is claimed is:

1. In a hydraulic damper:
   an outer tube having an inwardly turned axial end portion;
   a cylinder tube disposed in said outer tube and having an axial end;
   a piston rod disposed in said cylinder tube;
   a rod guide having an inner tubular portion defining a bore supporting said piston rod, an outer tubular portion extending in the same direction as said inner tubular portion does, and a flange portion extending radially outwardly from said outer tubular portion;
   said outer tubular portion being in engagement with said cylinder tube;
   said flange portion extending radially between said axial end and said outer tube;
   a ring connected between said inwardly turned axial end portion and said flange portion of said rod guide;
   a sealing assembly including a sealing element retainer supported by said flange portion and disposed in said ring;
   whereby said ring provides a transmission path of a force, thus preventing said sealing element retainer from being subject to the force.

2. A hydraulic damper as claimed in claim 1, wherein said flange portion includes an outer radially extending section, an inner radially extending section disposed inwardly of said outer radially extending section, and an axially extending wall portion interconnecting said outer and inner radially extending sections, and said sealing assembly includes a one-way check sealing lip carried by said sealing element retainer and in sealing contact with said inner radially extending section.

3. A hydraulic damper as claimed in claim 2, wherein said outer radially extending section is formed with at least one cutout.

4. A hydraulic damper as claimed in claim 2, wherein said ring is integral with said outer radially extending section.

5. A hydraulic damper as claimed in claim 2, wherein said ring includes a radially extending portion disposed on said outer radially extending section of said rod guide.

6. A hydraulic damper as claimed in claim 1, wherein said outer tubular portion has an axial end connected to said flange portion and an opposite axial end connected via a radially extending section to said inner tubular portion.

7. A hydraulic damper as claimed in claim 6, wherein said outer tubular portion has a coupling section engaged with said cylinder tube and a reduced diameter section which is connected via said radially extending section to said inner tubular portion.

8. A hydraulic damper as claimed in claim 7, wherein a stop cap is coupled with said reduced diameter section.

9. A hydraulic damper as claimed in claim 8, wherein the relationship between said reduced diameter section, said cylinder tube and said stop cap is such that there is provided an annular clearance defined between said stop cap and said cylinder tube.

10. A hydraulic damper as claimed in claim 9, wherein said flange portion includes an outer radially extending section, an inner radially extending section disposed inwardly of said outer radially extending section, and an axially extending wall portion interconnecting said outer and inner radially extending sections, and said sealing assembly includes a one-way check sealing lip carried by said sealing element retainer and in sealing contact with said inner radially extending section.

11. A hydraulic damper as claimed in claim 10, wherein said ring is integral with said outer radially extending section, and in engagement with said outer tube.

12. A hydraulic damper as claimed in claim 10, wherein said ring includes a radially extending portion disposed on said outer radially extending section of said rod guide, and in engagement with said outer tube.

13. A hydraulic damper as claimed in claim 11, wherein said inner radially extending section is in engagement with said axial end of said cylinder tube.

14. In a hydraulic damper:
   an outer tube having an inwardly turned axial end portion;
   a cylinder tube disposed in said outer tube and having an axial end;
   a piston rod disposed in said cylinder tube;
   a rod guide made by pressing of a circular plate to have an inner tubular portion defining a bore supporting said piston rod, an outer tubular portion extending in the same direction as said inner tubular portion does, and a flange portion extending radially outwardly from said outer tubular portion;
   said outer tubular portion being in engagement with said cylinder tube;
   said flange portion extending radially between said axial end and said outer tube;

a ring connected between said inwardly turned axial end portion and said flange portion of said rod guide;

a sealing assembly including a sealing element retainer supported by said flange portion and disposed in said ring;

said outer tubular portion having a coupling section engaged with said cylinder tube and a reduced diameter section which is connected to said inner tubular portion, said reduced diameter section being spaced from said cylinder tube to define an annular clearance between said reduced diameter section and said cylinder tube.

* * * * *